United States Patent [19]

Bostwick

[11] 4,312,918

[45] Jan. 26, 1982

[54] COMPOSITIONS OF POLYETHYLENE AND A COPOLYMER OF ETHYLENE-ALKYL ACRYLATE AND THE USE THEREOF AS JACKETING ABOUT TELEPHONE WIRES AND CABLES

[75] Inventor: Robert Bostwick, Somerset, N.J.

[73] Assignee: Union Carbide Corporation, New York, N.Y.

[21] Appl. No.: 187,131

[22] Filed: Sep. 15, 1980

[51] Int. Cl.³ .................... C08L 23/06; C08L 23/08
[52] U.S. Cl. .................................. 428/379; 525/227
[58] Field of Search ............... 525/222, 227; 428/379

[56] References Cited

U.S. PATENT DOCUMENTS

| | | | |
|---|---|---|---|
| 2,953,541 | 9/1960 | Pecha et al. | 525/227 |
| 3,182,101 | 5/1965 | Rees | 525/222 |
| 3,201,498 | 8/1965 | Brunson et al. | 525/227 |
| 3,248,359 | 4/1966 | Maloney | 260/41 |
| 3,253,059 | 5/1966 | Vollmer | 525/210 |
| 3,275,494 | 9/1966 | Brunson et al. | 428/167 |
| 3,366,589 | 1/1968 | Hammer et al. | 260/28.5 AV |
| 3,410,928 | 11/1968 | Baum | 525/210 |
| 3,663,663 | 5/1972 | McAda | 260/42.45 |
| 3,808,047 | 4/1974 | McAda | 428/379 |
| 3,927,145 | 12/1975 | Gaeckel et al. | 260/45.75 B |

*Primary Examiner*—Carman J. Seccuro
*Attorney, Agent, or Firm*—James C. Arvantes

[57] ABSTRACT

Polyethylene compositions, based on low density, high molecular weight polyethylene in admixture with a copolymer of ethylene-alkyl acrylate having a melt index of about 3 to about 24, wherein the combined alkyl acrylate content is about 16 to about 25 percent by weight and the copolymer is present in the composition in an amount sufficient to pass U.S. industry standards for stress cracking resistance, generally on the order of about 6 to about 25 percent by weight based on the combined weight of the polyethylene and the copolymer. The compositions of this invention, having improved environmental stress cracking resistance properties are particularly useful as jacketing about telephone wires and cables.

9 Claims, No Drawings

COMPOSITIONS OF POLYETHYLENE AND A COPOLYMER OF ETHYLENE-ALKYL ACRYLATE AND THE USE THEREOF AS JACKETING ABOUT TELEPHONE WIRES AND CABLES

SUMMARY OF THE INVENTION

This invention relates to compositions of polyethylene and a copolymer of ethylene-alkyl acrylate and the use of these compositions as jacketing material about telephone wires and cables. More particularly, this invention relates to compositions of a mixture of low density, high molecular weight polyethylene having a melt index of 0.08 to 0.25 and a density of 0.919 to 0.923, and a copolymer of ethylene and an alkyl acrylate, wherein the combined alkyl acrylate content of the copolymer is about 16 to about 25 percent by weight, the melt index of the copolymer is about 3 to about 24 and the copolymer is present in an amount sufficient to provide compositions which pass U.S. industry standards for stress cracking resistance, as subsequently described herein.

BACKGROUND OF THE INVENTION

The introduction of polyethylene as jacketing material about telephone wires and cables was an important development in the field of telephonic communications. Polyethylene was found to be corrosion-resistant, tough, abrasion-resistant and served to adequately protect the inner core of telephone wires and cables. Although polyethylene has properties which makes it desirable for use as jacketing material, as described, it also has other properties which presented problems. For example, polyethylene was found to degrade upon aging. Consequently, antioxidants were added to polyethylene in order to increase its working life. It was also found that polyethylene was degraded by the ultra-violet rays of the sun. This problem was solved by adding carbon black to the polyethylene.

One problem which still causes concern to the communications industry is the environmental stress cracking of polyethylene wires and cables. Communication wires and cables, obviously, have to be pulled through conduits as communication systems are being installed. In order to facilitate movement of the wires and cables through these conduits, it is customary to lubricate the polyethylene jacketing with surface active agents such as soaps and detergents. As the lubricated polyethylene wires and cables are stressed, on being pulled through the conduits, the lubricants induce large, full depth cracks to form in the polyethylene jacketing causing catastrophic failure of the wires or cables.

Catastrophic failures of polyethylene wire and cable due to environmental stress cracking has led to the adoption of stringent tests by the communications industry with respect to compositions proposed for use as jacketing material. These tests, which are two in number and are subsequently described, are referred to as United States industry standards for stress cracking resistance. As a rule, failure of either test renders a composition unacceptable, to domestic users, for wide use as jacketing material about telephone wires and cables.

The present invention provides compositions which pass both tests and consequently are particularly useful as material which can be extruded about telephone wires and cables, providing jacketing therefor. The compositions of this invention are especially attractive, from a commercial standpoint, as they are characterized by improved stress cracking resistance with no significant change in other physical properties such as yield strength, elongation and tensile strength.

The compositions of this invention comprise a mixture of a branched, low density, high molecular weight polyethylene having a melt index of 0.08 to 0.25 and a density of 0.919 to 0.923, and a normally solid copolymer of ethylene and an alkyl acrylate, having a melt index of about 3 to about 24, wherein the combined alkyl acrylate content is about 16 to about 25 percent by weight. The copolymer is present in the compositions in an amount which passes United States industry standards for stress cracking resistance, generally in an amount of about 6 to about 25 percent by weight, preferably in an amount of about 10 to about 20 percent by weight based on the combined weight of the polyethylene and the copolymer of ethylene-alkyl acrylate. The actual amount used will vary and depend upon the melt index of the copolymer as well as the combined alkyl acrylate content thereof.

As to the tests conducted, referred to as United States industry standards for stress cracking resistance, they were conducted as follows:

TEST A

Forty gram samples of material were processed in a Brabender, equipped with a Type 5 roller mixing head, for one hour at a head temperature of 154°±2° C. and a rotor speed of 125 rpm. The processed material was removed from the Brabender and molded into 0.125 inch thick sheets in a press which was at a temperature of 170° C. The mold unit of the press was removed while hot and cooled in running tap water to about room temperature. Each sheet, so molded, was removed from the mold and conditioned in an oven which was at a temperature of 70°±2° C. for 18 hours. Specimens 0.125 inch thick, 1.5 inches long and 0.5 inch wide were cut from the molded sheets and tested for stress cracking resistance according to the procedure described in ASTM-D 1693 using 10 percent by weight Igepal in water, as the reagent. Igepal is a surface active agent—iso-octyl phenoxy polyoxyethylene ethanol, manufactured by General Aniline and Film Corporation.

TEST B (Referred to as the REA test. REA stands for Rural Electrification Administration, U.S. Department of Agriculture).

Samples of material were milled and formed into sheets, 0.125 inch thick, by molding in a press according to Procedure A of ASTM-D 1928-70. Specimens were cut from each molded sheet and tested for stress cracking resistance according to the procedure described in ASTM-D 1693 using 10 percent by weight Igepal in water. Each specimen was 0.125 inch thick, 1.5 inches long and 0.5 inch wide.

A composition is considered to have passed Test A when there is a maximum failure of 20 percent after one day, based on 10 specimens tested.

A composition is considered to have passed Test B when there is a zero percent failure after four days, based on 10 specimens tested.

Polyethylene, suitable to be used in formulating the compositions of the present invention, have a melt index of 0.08 to 0.25 and a density of 0.919 to 0.923, as previously pointed out.

Density and melt index as noted herein were determined according to procedures described in ASTM-D 1505 (density—grams per cubic centimeter) and ASTM-D 1248 (melt index—decigrams per minute).

These polyethylenes, having the density and melt index as previously described, are highly branched, low density, high molecular weight polymers produced by the well known high pressure, tubular reactor, polymerization process as further described in U.S. Pat. No. 3,334,081 to George A. Madgwick et al patented Aug. 1, 1967, and in an article by L. F. Albright, entitled "HIGH PRESSURE PROCESS FOR POLYMERIZING ETHYLENES" which appeared in the Dec. 19, 1966 issue of *Chemical Engineering* at pages 113–120.

The ethylene-alkyl acrylate copolymers which are admixed with the polyethylene to provide the compositions of this invention are normally solid copolymers of ethylene and an alkyl acrylate having a melt index of about 3 to about 24 and containing about 16 to about 25 percent by weight combined alkyl acrylate, based on the total weight of the copolymer.

Combined alkyl acrylate content is conveniently determined by standard infra-red analysis.

A detailed description of suitable ethylene-alkyl acrylate copolymers, particularly ethylene-ethyl acrylate copolymers and a method for the production thereof is to be found in U.S. Pat. No. 2,953,551 to Wayne G. White patented Sept. 20, 1960.

Suitable alkyl acrylate monomers which are copolymerized with ethylene to produce the ethylene-alkyl acrylate copolymers of this invention fall within the scope of the following formula:

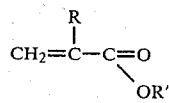

wherein R is hydrogen or methyl and R' is alkyl having one to 8 carbon atoms inclusive. Illustrative of compounds encompassed by this formula are the following: methyl acrylate, ethyl acrylate, ethyl methacrylate, n-butyl acrylate, n-butyl methacrylate, 2-ethylhexyl acrylate and the like.

If desired, more than one polyethylene and also more than one ethylene-alkyl acrylate copolymer can be admixed to produce the compositions of this invention. Utilizing mixtures, the resultant mixture of polyethylenes and/or copolymers of ethylene-alkyl acrylate would be such as to have the density, melt index and combined alkyl acrylate content previously described.

The compositions of this invention may also contain various additives, for example, to plasticize, to stabilize, to lubricate, to prevent oxidation and to lend color to the compositions. Such additives are well known and may be added to the compositions of this invention in convenient amounts, as is well known by those skilled in the art, without significantly detracting from the beneficial properties of the compositions. Illustrative of such additives are substituted phenols, thiobisphenols, aromatic amines, dyes, pigments, carbon black, ultra-violet light absorbents, fatty acid amides, waxes, clays, alkaline earth carbonates, rubber and the like.

It is preferred to admix the polyethylene and the ethylene-alkyl acrylate copolymer at a temperature sufficiently high to flux the components in order to produce a blend of better uniformity and greater homogeniety. The hot mixing can be satisfactorily carried out in a Banbury mixer, on a two-roll mill, in a compounding extruder or other such apparatus.

The following examples further illustrate the present invention and are not intended to limit the scope thereof in any manner.

Also, the disclosure of all patents and literature references are incorporated herein by reference.

Polymers used in conducting the examples and controls were the following:

Polyethylene

Polymer A—polyethylene having a melt index of 0.10 and a density of 0.921

Polymer B—polyethylene having a melt index of 20 and a density of 0.924

Polymer C—polyethylene having a melt index of 5.7 and a density of 0.920

Copolymer of Ethylene-Alkyl Acrylate

Copolymer 1—copolymer of ethylene-ethyl acrylate containing 23 percent by weight combined ethyl acrylate and having a melt index of 21

Copolymer 2—copolymer of ethylene-ethyl acrylate containing 19 percent by weight combined ethyl acrylate and having a melt index of 4.5

Copolymer3—copolymer of ethylene-ethyl acrylate containing 18 percent by weight combined ethyl acrylate and having a melt index of 21

EXAMPLE 1

This example was carried out by hot processing a composition, the formulation of which is set forth below, in a Brabender mixer, which was operating at a rotor speed of 50 rpm and at a temperature of 150° C., for five minutes. The composition was then tested for environmental stress cracking in a manner previously described.

|  | PARTS BY WEIGHT |
|---|---|
| Polymer A | 82.3 |
| Copolymer 1 | 10 |
| Polyethylene having a melt index of 1000 and a density of 0.88 (served as processing aid) | 5 |
| Carbon black | 2.6 |
| 4,4'thiobis(6-tertiary-butyl-3-methylphenol)(antioxidant) | 0.1 |

Amount of Copolymer 1 present in the composition was on the order of 10.8 percent by weight, based on the combined weight of Polymer A and Copolymer 1.

EXAMPLE 2

The composition of this example was identical to the composition of Example 1, with the exceptions that Polymer A was present in an amount of 77.3 parts by weight and Copolymer 1 was present in an amount of 15 parts by weight, or in an amount on the order of 16.3 percent of weight, based on the combined weight of Polymer A and Copolymer 1.

CONTROL 1

The composition of Control 1 was identical to the composition of Example 1 with the exceptions that Polymer A was present in an amount of 87.3 parts by weight, and Copolymer 1 was present in an amount of 5 parts by weight.

The amount of Copolymer 1 present in the composition was on the order of 5.4 percent by weight, based on the combined weight of Polymer A and Copolymer 1.

CONTROL 2

This composition was identical to the composition of Control 1 with the exceptions that Polymer A was present in an amount of 92.3 parts by weight and Copolymer 1 was not present.

CONTROL 3

This composition was identical to the composition of Control 1 with the exceptions that Copolymer 1 was present in an amount of 92.3 parts by weight and Polymer A was not present.

Stress cracking resistance of the compositions of Examples 1-2 and Controls 1-3 are reported in Table I.

TABLE I

| | Percent Failures After Days Indicated | | | | | | |
|---|---|---|---|---|---|---|---|
| | Test A | | | Test B | | | |
| | 1 | 7 | 21 | 2 | 5 | 7 | 21 |
| Example 1 | 0 | 0 | 0 | 0 | 0 | 0 | 0 |
| Example 2 | 0 | 0 | 0 | 0 | 0 | 0 | 0 |
| Control 1 | 50 | 70 | 70 | 0 | 30 | 40 | 60 |
| Control 2 | 100 | — | — | 100 | — | — | — |
| Control 3 | 100 | — | — | 100 | — | — | — |

A number of compositions, the formulations of which are shown below, were prepared as previously described.

These compositions were then tested for environmental stress cracking resistance and the results reported in Table II.

TABLE II

| | Parts by Weight | | | |
|---|---|---|---|---|
| Formulation | Example III | Example IV | Example V | Example VI |
| Polymer A | 82.3 | 82.3 | 82.3 | 82.3 |
| Copolymer 1 | 10 | 15.0 | — | — |
| Copolymer 2 | — | — | 10 | 15.0 |
| Polyethylene-processing aid (same as in Example 1) | 5.0 | — | 5.0 | — |
| Carbon Black | 2.6 | 2.6 | 2.6 | 2.6 |
| Antioxidant (same as in Example 1) | 0.1 | 0.1 | 0.1 | 0.1 |

| Physical Properties | Example III | Requirement for Jacketing Material |
|---|---|---|
| Yield Strength, psi, ASTMD 638 | 1320 | 1000 minimum |
| Elongation, percent, ASTMD 638 | 755 | 400 minimum |
| Low Temperature Brittleness at −76° C., percent failures ASTMD 746 | 0 | 40 maximum |
| Dielectric Constant, ASTMD 1531 | 2.58 | 2.80 maximum |

TABLE II (a)

| | Percent Failures After Days Indicated | |
|---|---|---|
| | Test A (After One Day) | Test B (After Four Days) |
| Example III | 0 | 0 |
| Example IV | 0 | 0 |
| Example V | 20 | 0 |

TABLE II (a)-continued

| | Percent Failures After Days Indicated | |
|---|---|---|
| | Test A (After One Day) | Test B (After Four Days) |
| Example VI | 0 | 0 |

Compositions with contents of ethylene-ethyl acrylate copolymers on the order of about 13 to about 20 percent by weight were prepared and tested for environmental stress cracking resistance, in a manner as previously described. Formulations of these compositions are noted below and test results are reported in Table III.

TABLE III

| | Parts by Weight | | |
|---|---|---|---|
| Formulation | Example VII | Example VIII | Example IX |
| Polymer A | 72.3 | 79.8 | 74.8 |
| Copolymer 2 | 20.0 | — | — |
| Copolymer 3 | — | 12.5 | 17.5 |
| Polyethylene processing aid (same as in Example 1) | 5 | 5 | 5 |
| Carbon Black | 2.6 | 2.6 | 2.6 |
| Antioxidant (same as in Example 1) | 0.1 | 0.1 | 0.1 |

TABLE III (a)

| | Percent Failure After Days Indicated | |
|---|---|---|
| | Test A (After One Day) | Test B (After Four Days) |
| Example VII | 0 | 0 |
| Example VIII | 0 | 0 |
| Example IX | 0 | 0 |

A number of compositions were formulated with varying amounts of polymers being used. These compositions were prepared in a manner previously described and tested for environmental stress cracking resistance. Each composition contained 2.6 parts by weight carbon black, 0.1 parts by weight antioxidant (Example 1) and varying amounts of polymers as indicated in Table IV. Test results are also reported in Table IV. Percent by weight reported in Table IV is based on the combined weight of Polymer A and Copolymer 1.

TABLE IV

| | | Percent Failures After Days Indicated | |
|---|---|---|---|
| Polymer A %/wt. | Copolymer 1 %/wt. | Test A 1 Day | Test B 1 Day |
| 100 | 0 | 100 | 100 |
| 25 | 75 | 100 | 100 |
| 12.5 | 87.5 | 100 | 100 |
| 0 | 100 | 100 | 100 |

In order to further demonstrate the unique character of the compositions of the present invention, two polyethylenes, Polymer B and Polymer C, were admixed, in a manner described in Example 1, with Copolymer 3 to formulate compositions with varying amounts of polymers.

Each composition contained 2.6 parts by weight carbon black, 0.1 part by weight antioxidant (described in Example 1) and various amounts of Polymers B and C and Copolymer 3 as indicated in Table V. Percent by weight reported in Table V is based on the combined weight of Polymers B or C and Copolymer 3.

Polymers B and C, in effect, are disclosed in U.S. Pat. No. 2,953,541 to Richard J. Pecha et al, patented Sept. 20, 1960 and do not fall within the scope of the present invention.

TABLE V

| Polymer B %/wt. | Polymer C %/wt. | Copolymer 3 %/wt. | Percent Failures After One Hour Test A |
|---|---|---|---|
| 87.5 | 0 | 12.5 | 100 |
| 75 | 0 | 25 | 100 |
| 0 | 87.5 | 12.5 | 100 |
| 0 | 75 | 25 | 100 |

In addition to being useful as jacketing about telephone wires and cables, the compositions of this invention can be molded or extruded into various articles such as pipes, tubing, plaques, sheets and other articles useful as housewares.

What is claimed is:

1. A composition comprising a branched, low density, high molecular weight polyethylene having a melt index of 0.08 to 0.25 and a density of 0.919 to 0.923 and a copolymer normally solid of ethylene and an alkyl acrylate wherein the combined alkyl acrylate content of said copolymer is about 16 to about 25 percent by weight, the melt index of the said copolymer is about 3 to about 24 and the said copolymer is present in an amount sufficient to pass industry standards for stress cracking resistance, in the range of about 6 to about 25 percent by weight, based on the combined weight of said polyethylene and said copolymer, said composition passing U.S. industry standards for stress cracking resistance according to Test A, the Brabender Test and Test B, the REA test as described in this specification.

2. A composition as defined in claim 1 wherein the said copolymer is present in an amount of about 10 to about 20 percent by weight.

3. A composition as defined in claim 1 wherein said copolymer is a copolymer of ethylene and ethyl acrylate.

4. A composition as defined in claim 1 wherein the said polyethylene has a melt index of 0.10 and a density of 0.921.

5. A composition as defined in claim 3 wherein the said polyethylene has a melt index of 0.10 and a density of 0.921.

6. A composition as defined in claim 5 containing a copolymer of ethylene-ethyl acrylate having a melt index of 21 and containing 23 percent by weight combined ethyl acrylate.

7. A composition as defined in claim 5 containing a copolymer of ethylene-ethyl acrylate having a melt index of 4.5 and containing 19 percent by weight combined ethyl acrylate.

8. A composition as defined in claim 5 containing a copolymer of ethylene-ethyl acrylate having a melt index of 21 and containing 18 percent by weight combined ethyl acrylate.

9. A telephonic communications wire or cable having as jacketing thereon the composition defined in claim 1.

* * * * *

UNITED STATES PATENT AND TRADEMARK OFFICE
CERTIFICATE OF CORRECTION

PATENT NO. : 4,312,918
DATED : January 26, 1982
INVENTOR(S) : Robert Bostwick

It is certified that error appears in the above—identified patent and that said Letters Patent is hereby corrected as shown below:

Claim 1, line 4; "copolymer normally solid" should read --normally solid copolymer--.

Signed and Sealed this

Tenth Day of August 1982

[SEAL]

Attest:

GERALD J. MOSSINGHOFF

Attesting Officer

Commissioner of Patents and Trademarks